United States Patent Office 3,498,693
Patented Mar. 3, 1970

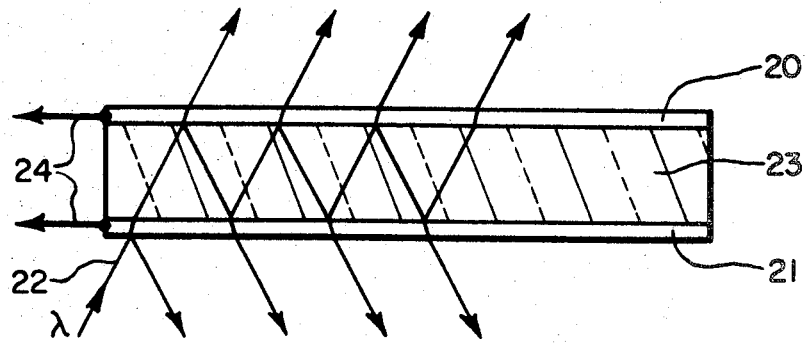
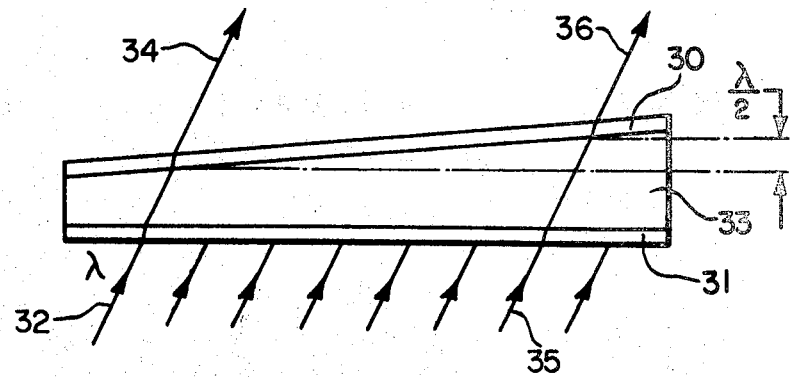
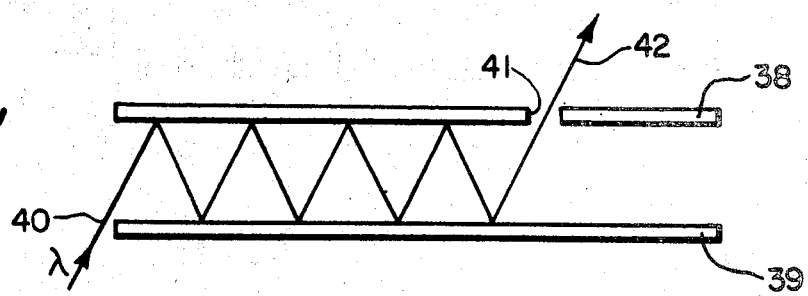
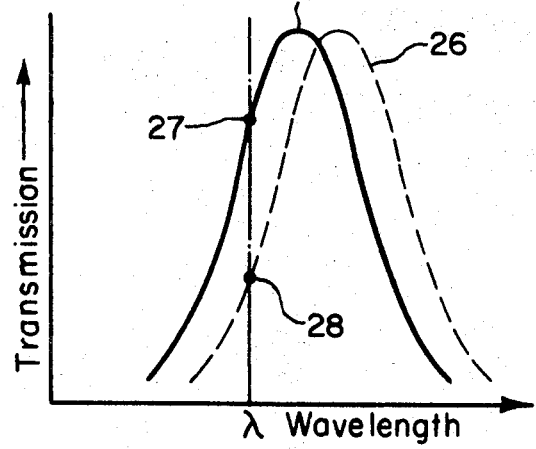

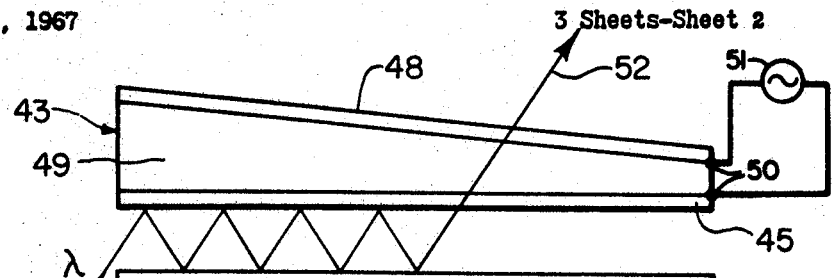
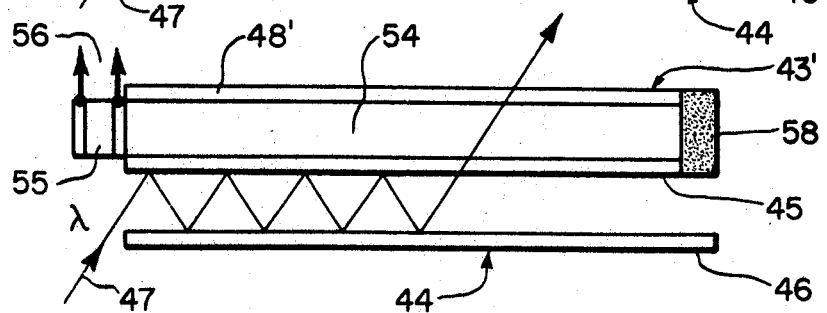
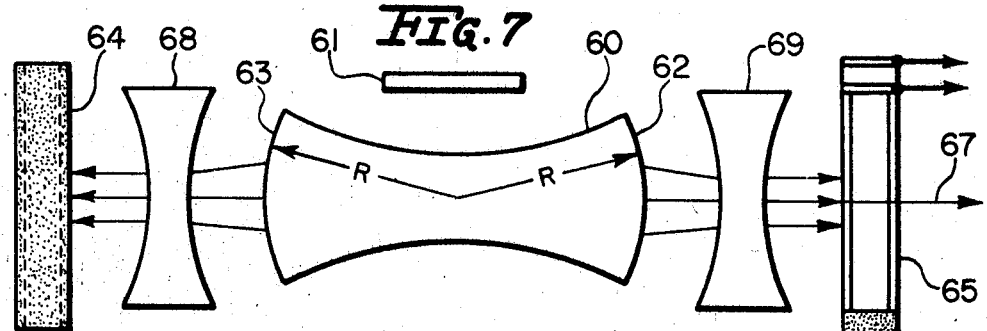
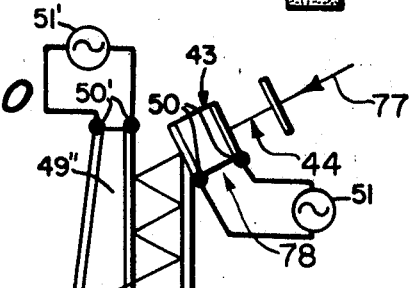
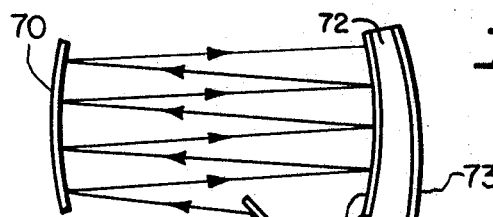
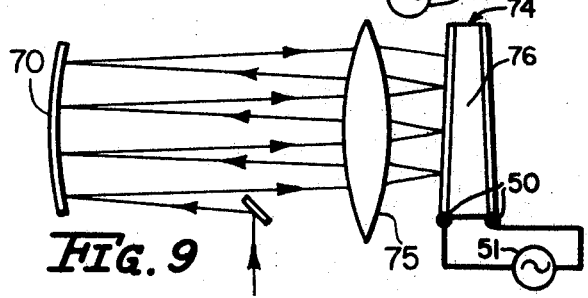

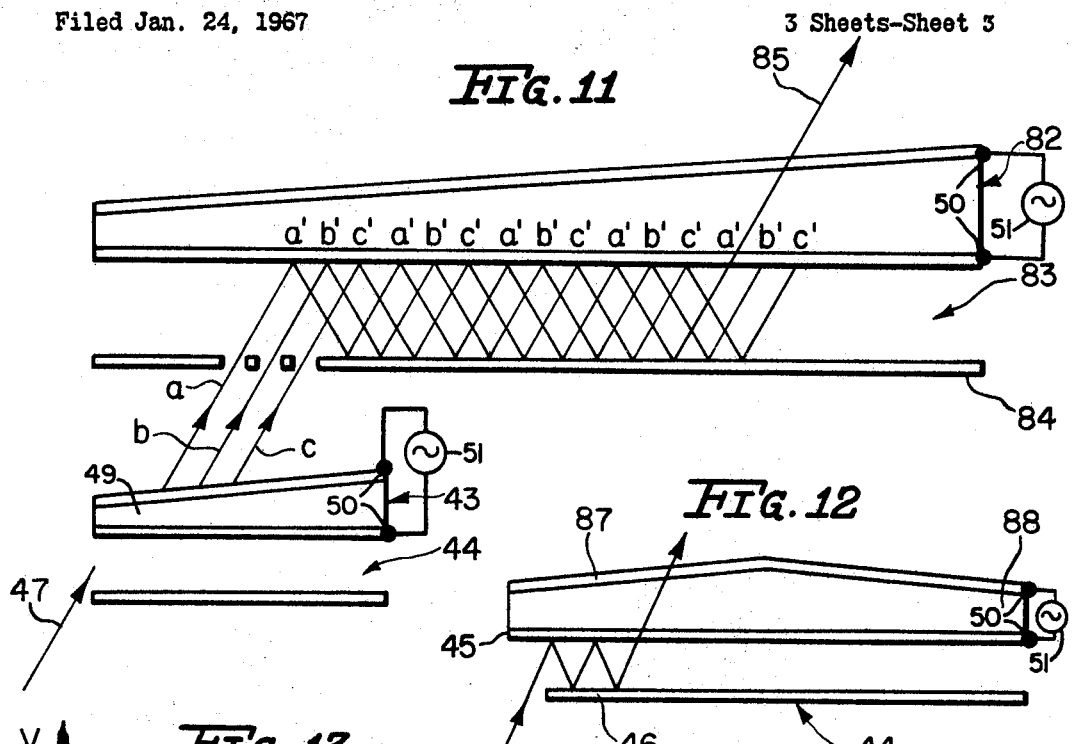
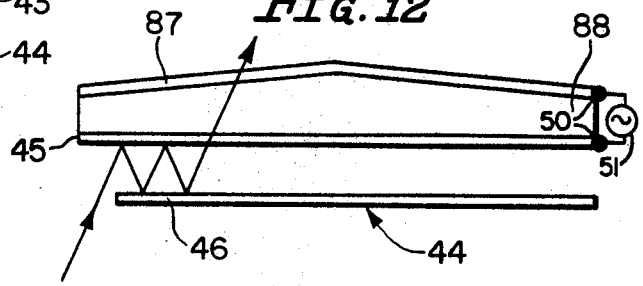
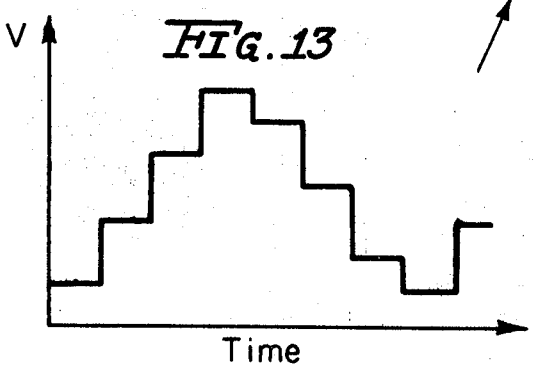
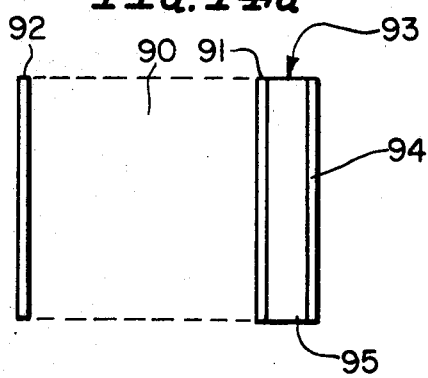
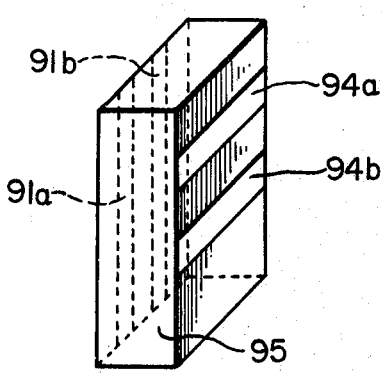
Inventors
Michael E. Fein
Joseph Markin
Alan Sobel
By Hugh H. Drake
Attorney

3,498,693
RADIATION TRANSLATING DEVICES
Michael E. Fein, Champaign, and Joseph Markin and Alan Sobel, Evanston, Ill., assignors to Zenith Radio Corporation, Chicago, Ill., a corporation of Delaware
Filed Jan. 24, 1967, Ser. No. 611,457
Int. Cl. G02f *1/28;* G02b *5/08*
U.S. Cl. 350—160                                    15 Claims

ABSTRACT OF THE DISCLOSURE

An optical interference filter is contiguous with an optical cavity in which a beam of light is multiply reflected. The filter is caused to be transmissive in a localized area to permit the light to emerge from the cavity through that area, and the filter is arranged so that the location of the transmissive area may be changed selectively.

INTRODUCTION

The present invention pertains to radiation translating devices. More particularly, it relates to apparatus, such as display devices, receptive to optical radiation and capable of causing that radiation to be deflected or scanned selectively to one or more different positions. While the invention is applicable to the case of radiation in various ranges, including infrared, visible and ultraviolet light, it is particularly suitable for the case of visible light and therefore is described hereinafter in that connection.

The cathode-ray tube is the conventional and most usual present-day device for producing an image display. However, considerable attention has been devoted in recent years to other apparatus capable of producing light selectively at any one or more of a number of points. Exemplary of such apparatus are electroluminescent display panels, injection-luminescent radiation systems and light-sound interaction apparatus for deflecting high-intensity beams such as those produced by a laser. While varying degrees of success have been achieved by different ones of these systems, there remains the need for efficient and compact devices useful in such an environment.

It accordingly is a general object of the invention to provide new and improved radiation translating devices.

It is a more specific object of the present invention to provide an image display device which is capable of displacing received light selectively to any one of a number of desired emergence positions.

It is another object of the present invention to provide a radiation translating device capable of advantageous combination with a variety of light production systems.

A radiation translating device in accordance with the invention comprises a pair of opposing spaced reflectors receptive to a beam of radiation for multiply reflecting that beam back and forth therebetween. One of the reflectors is responsive to a stimulus for creating a localized region therein highly transmissive of the beam at one of its areas of incidence upon the one reflector. Finally, the device includes control means for subjecting the one reflector to the aforesaid stimulus.

In a particularly interesting aspect of the invention, the control means includes a reflecting layer spaced to one side of one of the reflectors. Those two elements together constitute an interference filter for the light in the beam. The control means acts to vary the optical spacing between the one reflector and the reflective layer effectively in a localized area, rendering that area transmissive of radiation. That variation in the spacing is caused to move the transmissive area along the one reflector.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

FIGURE 1 is a schematic diagram of a light-interference filter;

FIGURE 2 is a response curve of the filter of FIGURE 1;

FIGURE 3 is a diagram of a modified form of the filter of FIGURE 1;

FIGURE 4 is a diagram of a light conduction device;

FIGURE 5 is a schematic representation of a radiation translating device incorporating in combination the apparatus of FIGURES 3 and 4;

FIGURE 6 is a diagram of a radiation translating device alternative to that of FIGURE 5;

FIGURE 7 schematically illustrates another radiation translating device;

FIGURES 8 and 9 schematically depict modifications of the radiation translating device shown in FIGURE 5;

FIGURE 10 illustrates a further modification and extension of the device of FIGURE 5;

FIGURE 11 illustrates a different modification and extension of the device of FIGURE 5;

FIGURE 12 represents schematically a device which is alternative to that of FIGURE 5;

FIGURE 13 is a curve of potential against time useful in explaining one mode of operation of different ones of the figures;

FIGURE 14a is a diagrammatic side-elevational view of still another radiation translating device; and FIGURE 14b is a diagrammatic perspective view of a portion of the device of FIGURE 14a.

FIGURE 1 basically illustrates an interference filter including spaced, parallel reflecting films 20 and 21 both slightly transmissive of, while yet being highly reflective to, incoming light of wavelength λ in the form of a beam following an incidence path 22. Such a filter conventionally is employed as a selector of a particular narrow band of optical wavelengths from among a broad spectrum of possible illumination. In this instance, a beam of monochromatic light incident along path 22 is partially reflected at reflector 21 and partially transmitted therethrough to reflector 20. At the latter reflector, a portion of the light is similarly reflected back toward reflector 21, while the other portion is transmitted on through reflector 20. That portion reflected back from reflector 21 in turn is partly transmitted through reflector 21 and partly reflected once more back toward reflector 20. This process is repeated at each point of internal reflection, as illustrated. In consequence, light emerges at a plurality of points along each of reflectors 20 and 21.

On each successive transit across the space between reflectors 20 and 21, the light is delayed so that one emerging beam is different in phase from that of the beam adjacent thereto. When the spacing between reflectors 20 and 21 is such that the delay between two adjacent beams emerging from reflector 20 is an integral multiple of one wavelength of the incident radiation, the two beams reinforce each other. Under this same condition of spacing, or more basically of effective optical path length between the two reflectors, the reflected rays emerging backwardly from the surface of reflector 21 interfere destructively. Consequently, in principle, at the particular spacing where the effective one-way optical path length is an integral multiple of one-half wavelength of the incoming radiation, substantially all of the incoming light is transmitted through the interference filter.

The schematic representation of the light paths in FIGURE 1 is greatly simplified. The incoming light beam 22 is of sufficient width relative to the filter thickness that all the light paths shown in the figure are essentially superimposed or overlapping. It is the interference of the light among these multiple, parallel, and essentially superimposed beams of light which is responsible for the wavelength-selecting properties of the interference filter. These basic principles of interference filter operation are well known, having been described in such standard references as Light, by R. W. Ditchburn, Interscience Publishers, New York, N.Y., 2nd ed. (1963), pp. 121–129, 140–141, 152–154, and Introduction to Electricity and Optics, by Nathaniel H. Frank, McGraw-Hill Book Co., New York, N.Y., 2nd ed. (1950), pp. 362–370.

The optical bandwidth of this type of interference filter is determined by the number of times the light is reflected internally between reflectors 20 and 21, and this, in turn, is a function of the individual percentage of transmission through each of the films at each point of reflection. For metallic reflecting films, high reflectivities generally are accomplished by substantial absorption of the light, as a result of which sharp selectivity is achieved only at the expense of reduced available intensity. It is preferred, therefore, that reflectors 20 and 21 be composed of multiple-layer dielectric reflectors of the kind currently used in defining laser cavities.

Completing the structure in FIGURE 1 is a dielectric or electro-optic element 23 sandwiched between reflectors 20 and 21. Consequently, the effective optical path length between the reflectors is a function not only of the thickness of element 23 but also of its index of refraction. In this instance, element 23 has a refractive index which varies in response to the application of an electric field thereacross, and to that end reflectors 20 and 21 may be electrically conductive. Alternatively, the reflectors may each include a separate transparent conductive film. In still another arrangement, the filter may include electrodes parallel to the plane of the drawing of FIGURE 1, and the dielectric material used exhibits a transverse electrooptic effect. In any event, the conducting films or layers are provided with terminals 24 to which an external source of potential is connected. A change in the applied voltage changes the refractive index directly and thus effectively changes the optical thickness of the entire filter. This shifts its resonant wavelength, its wavelength of maximum transmission.

The resonant effect is illustrated in FIGURE 2 where solid-line curve 25 represents the selectivity or response in terms of percentage of transmission of the filter under the condition of no applied field potential. Curve 26, on the other hand, represents the response curve which shifted in wavelength for the condition in which an applied potential of predetermined magnitude is applied. Thus, in this particular case the effect of applying the potential is to lower the proportion of the light, of given wavelength λ, which is transmitted by the filter from the value indicated in FIGURE 2 at point 27 to that indicated at point 28.

FIGURE 3 illustrates another interference filter which includes the same elements as in FIGURE 1 but in a different configuration. In this case, reflectors 30 and 31 are the same as reflectors 20 and 21 except that reflector 30 is inclined at an angle to reflector 31 so that the resulting interference filter is tapered along its length. As before, the space between reflectors 30 and 31 is occupied by a dielectric element 33. A portion of the light of wavelength λ incident along a path 32 is transmitted through the filter and emerges from reflector 30 along a path 34 at a point or area where the one-way optical path length through the filter is an integral multiple of one-half the light wavelength. At the same time, another beam of the same light incident upon the filter along a path 35 is also transmitted through the filter and emerges from reflector 30 along a path 36. As indicated earlier, the emerging beams indicated by lines 34 and 36 actually comprise light which has been reflected within the filter many times. The optical path length through the filter for path 36 is one-half wavelength more than that for light emerging along path 34. By constructing the interference filter to be wedge-shaped, monochromatic incident light illuminating all of the external surface of reflector 31 is transmitted through the filter only at those places or zones where the effective one-way optical path length is one-half wavelength long or an integral multiple thereof. These places are spaced along the filter at locations, determined by the taper of the filter, at which the filter's effective optical thickness differs by one-half wavelength. Because of the tapered thickness, the filter selectively rejects the light at other points between paths 34 and 36.

As in FIGURE 1, the application of an electric field to element 33 changes the optical thickness of the filter. By varying the magnitude of the electric field, the particular place or places at which transmission of the light takes place can be changed. With an increase in the applied potential, the point of light transmission is moved or scanned across the surface of reflector 30. Consequently, with reflector 31 illuminated over its entire surface, the point or spot of light emerging from reflector 30 is caused to move along the latter from one side to the other in response to a corresponding change in the applied potential. When the interference filter of FIGURE 3 is of significant depth in the direction perpendicular to the plane of the drawing, the emerging light is in the form of a movable band or line.

In FIGURE 4, a different optical phenomenon takes place although at first glance the general appearance may seem similar. Here, the apparatus includes parallel reflectors 38 and 39 each highly reflective of light of wavelength λ incoming along a path 40. Light entering along path 40 is totally reflected back and forth between the two reflectors until it finds an opening 41 in reflector 38 where it escapes along a path 42. The FIGURE 4 device, therefore, is a light trap. Light can emerge only where an escape point is provided and at that point all the light escapes.

In accordance with one aspect of the present invention, it is contemplated to combine the basic functions of the apparatus shown in FIGURES 3 and 4 into one device so as effectively to cause opening 41 to move or to be scanned along reflector 38. This is accomplished in the device of FIGURE 5 in which a wedge-shaped interference filter 43 is cascaded with a light trap 44. Trap 44 includes reflectors 45 and 46, which correspond in function to reflectors 38 and 39 of FIGURE 4, arranged to receive therebetween light of wavelength λ traversing an incident beam path 47. Reflector 45 also constitutes a reflective element of interference filter 43. The latter's other reflector, angled with respect to reflector 45, is in the form of a reflective layer 48. Reflector 45 and layer 48 are sandwiched about a dielectric element 49. As in the case of FIGURE 3, terminals 50 are provided to permit the application of an external potential across dielectric element 49 by means of a variable potential source 51 connected to the terminals.

In operation, the incident light incoming along path 47 is reflected back and forth along light trap 44 until it encounters a region of interference filter 43 in which the optical path length therethrough is in the vicinity of an integral multiple of one-half the light wavelength. At that point, substantially all the light which entered trap 44 is transmitted through this region of reflector 45 and the corresponding zone of dielectric 49 and emerges through layer 48 along a path 52. As was the case with respect to FIGURE 3, control of the potential applied to terminals 50 serves to adjust the index of refraction of dielectric element 49, which in turn varies the effective optical path length through filter 43 and permits movement or scanning of the localized region of maximum transmission along the filter from one side to the other.

A wide variety of materials may be used to form dielectric element 49. A typical example of one such material is crystalline potassium dihydrogen phosphate oriented so that the electric field is directed along the appropriate crystal axis. Reflectors 45 and 46 and reflective layer 48 conveniently may be constructed the same and of the same materials as are conventionally utilized today in the construction of laser cavity mirrors, with the addition of a conducting layer oriented in accordance with the field excitation direction of the dielectric selected. Instead of utilizing a dielectric which varies in index of refraction under the influence of a variation in applied potential, it is contemplated as an alternative to utilize an electrostrictive material the thickness of which changes in response to an electric field or a material which at least effectively changes its index of refraction in response to thermal energy. Of course, it is also realizable in principle to vary the effective optical spacing along the length of the filter by physically varying the angle of tilt between layer 48 and reflector 45.

As a still further alternative embodiment in which the effective optical spacing is controllably varied in only a localized region of an interference filter, FIGURE 6 utilizes propagating acoustic waves to effect movement of the localized region of maximum transmission. To this end, optical trap 44 is the same as in FIGURE 5 and interference filter 43' includes a reflective layer 48' opposite reflector 45 but in this case parallel thereto. Sandwiched between layer 48' and reflector 45 is an element 54 propagative of acoustic waves and affixed at one end to a transducer 55 for launching those acoustic waves in response to a control signal applied to terminals 56 of the transducer. Completing the assembly is a sound absorbing medium 58 secured to the end of element 54 remote from transducer 55 to absorb and prevent reflection of the acoustic wave pulses.

In this embodiment, a pulse of sound energy is caused to travel the length of element 54 in the form of a compressional or shear wave. The effect of each region of compression or distortion is to increase the density or strain of element 54 and thereby to increase the effective optical path length between reflector 45 and reflective layer 48' by an amount sufficient to make that path length substantially equal to an integral multiple of one-half the incoming light wavelength. Thus, the denser or strained optically transmissive region travels the length of the interference filter from one end to the other, thereby moving the region of escape for light in optical trap 44.

Whether the optical path length variation is by means of electro-optic, electrostrictive, compressional-wave or other equivalent technique, it should be noted that the relative dimensions, as well as the angle of taper in FIGURES 3 and 5, are greatly exaggerated in the drawings for purposes of clarification. In actuality, one-half wavelength of the light radiation is such a short distance in mechanical terms as to enable fabrication of the devices disclosed herein in the form of extremely thin films and layers while, at the same time, any one layer, such as reflector 46, may be of greater thickness and strength to lend rigidity to the entire device.

The devices as thus far described find a wide range of application in combination with correlated parts of overall light-translating systems. FIGURE 7 is an example of one such system wherein a laser cavity is defined by reflectors 64 and 65. The active material of the laser is confined in an envelope 60 which has spherical end surfaces 62 and 63 that are coated to reduce reflection losses and which image reflector 64 on reflector 65. Lenses 68 and 69 compensate for the effects of the converging lenses formed by surfaces 62 and 63 so that light falls perpendicularly on reflectors 64 and 65. Light source 61 produces pump energy for the laser. This arrangement is capable of supporting a large number of different modes of oscillation, in which optically conjugate points on reflectors 64 and 65 emit light when the path length between such points is a resonant length and the phases of the light reflected from the points are correct. The arrangement is similar to one described by R. V. Pole in the Journal of the Optical Society of America, vol. 55, p. 254 (March, 1965). The magnitudes of the reflection coefficients of the two reflectors must also be correct for the emission of light; if the reflectivity is too high, not enough light will be transmitted through the reflector, while if the reflectivity is too low, the light will not pass through the active medium enough times and the laser will not generate light. These operating features are well understood, per se.

In the arrangement of FIGURE 7, selection of particular modes of oscillation is accomplished by selectively controlling the localized reflectivities of reflectors 64 and 65. To this end, mirrors 64 and 65 are interference filters which may be of the type depicted in FIGURE 3, but are here illustrated as being of the type shown in FIGURE 6. Considering filter 64 first as being uniformly and totally reflecting, activation of filter 65 so that it exhibits a region or zone of the appropriate transmissivity results in the emergence of a band of light from filter 65 as indicated by the arrow projected through that filter. At the same time, filter 64 is oriented orthogonally to filter 65 so that in filter 64 the activating acoustic waves travel at right angles to those in filter 65; when the wedge action of the FIGURE 3 filter is used instead, the tapers of the two filters at either end of the FIGURE 7 device are mutually orthogonal. Consequently, now considering filter 65 as being uniformly and totally reflective, activation of filter 64 so that it exhibits a region or zone of the appropriate transmissivity results in the emergence of a band of light from the filter which moves at right angles to the band of light illustrated above as emerging from filter 65.

In practice, both filters 64 and 65 are activated simultaneously to develop respective mutually orthogonally moving bands of the correct transmissivity for the translation of light therethrough. The degree of transmissivity, or the reflectivity of each filter in its transmissive zone, is chosen so that light is transmitted through the filters only from a spot corresponding to the effective intersection (though spatially separated) of the respective bands of higher transmissivity. Consequently, the overall system of FIGURE 7 enables the selection of a particular point or points of light emergence and enables control and movement of the location of such points.

While FIGURES 6 and 7 are quite different in structural appearance, it may be observed that a basic similarity of operation exists between FIGURE 7 and FIGURE 6. That is, the entire lasing system between interference filters 64 and 65 in FIGURE 7 performs a similar function to that of light trap 44 in FIGURE 6; in both cases the interference filter(s) determines the point of light emergence from a multiply-reflecting light system.

One possible limitation in the performance of light trap 44 in FIGURES 5 and 6 arises by reason of spread of the multiply-reflecting light beam due to diffraction effects. It is contemplated to overcome this difficulty by effectively curving the light trap reflectors toward one another in an amount refocusing the beam on each one of the multiple reflections. The reduction of beam spread by use of this kind of technique has been described, as such, by D. R. Herriott and A. J. Schulte in Applied Optics, vol. 4, pp. 883–889 (August, 1965). FIGURE 8 illustrates a modification of the FIGURE 5 device to incorporate this principle. Thus, reflector 70 corresponds to reflector 46, dielectric 72 to dielectric 49, reflector 71 to reflector 45 and reflective layer 73 to layer 48 of FIGURE 5. Reflectors 70 and 71 are slightly concave and face one another with the entire interference filter defined by reflector 71 and layer 73 being slightly curved as well as tapered.

Instead of encountering the possible physical complexity attendant to curving the surfaces of the wedge-shaped filter in FIGURE 8, the same effect is achieved in FIGURE 9 by utilizing a straight-sided wedge-shaped interference filter 74 in conjunction with concave reflector 70. Included between the latter and the interference filter is a convergent optical lens 75 which has a refractive power sufficient to refocus the beam onto interference filter 74 during each reflective pass. Terminals 50 are again provided at each of the reflective layers of the interference filter 74, as is a variable potential source 51 connected to them, and the filter incorporates a dielectric 76 corresponding to dielectric 72 in FIGURE 8.

As another approach to scanning of a light beam in two orthogonal directions, FIGURE 10 represents a system in which two interference-filter optical-trap combinations are cascaded. The incident light arriving along a path 77 traverses a first scanning unit 78 composed of optical trap 44 and wedge-shaped interference filter 43 of FIGURE 5; an end view of unit 78 is depicted in FIGURE 10. The system of FIGURE 10 further includes a second optical trap 44″ associated with a second interference filter 43″, having a second dielectric 49″, a second set of terminals 50′, and a variable potential source 51′, which together constitute a second scanning unit 79 by itself also constructed and operated like the device of FIGURE 5.

As shown in FIGURE 10, the light arriving along path 77 is deflected along a path extending into and out of the plane of the paper. Scanning unit 79 is oriented relative to unit 78 to receive the light emerging from the latter and to, in turn, cause it to be scanned in the orthogonal direction lying in the plane of the paper. Consequently, by correlating the scanning control signals applied to units 78 and 79, in a manner fully analogous to the horizontal and vertical electron beam deflection signals applied to a cathode-ray tube image display system in a conventional television receiver, a complete image raster is defined. Because, for a total raster area, unit 79 is of substantially larger area than that of unit 78, and consequently exhibits a larger capacitance to the applied control signal, it is preferred in application to such a television system that unit 78 be employed for horizontal scanning and that unit 79 be employed for the much lower frequency of vertical scanning.

In order to reduce the number of individual reflections within any given length of one of the scanning devices, while at the same time increasing the resultant number of resolvable spots which can be generated without ambiguity within a given system, it is contemplated to utilize a multistage arrangement an example of which is shown in FIGURE 11. The first stage is composed of wedge-shaped interference filter 43 and optical trap 44. For illustration, the light incident along path 47 may emerge from filter 43 along any of paths $a$, $b$ or $c$ in correspondence with three different values of control potential applied to interference filter 43.

Disposed across paths $a$, $b$ and $c$ is the second stage of the device which is in the form of a second, and in this case longer, spatial selector essentially like that of the first stage. The second stage includes an interference filter 82, dielectric 86, terminals 50′ and an optical trap 83 associated with each other and operable in response to a control potential from variable potential source 51′ in the same manner as the FIGURE 5 device. As shown in FIGURE 11, however, the initial reflector 84 of trap 83 includes three openings spaced therein in alignment with paths $a$, $b$ and $c$.

In operation, when the control potential applied to filter 43 permits the light to emerge therefrom along path $a$, that emerging light is in turn multiply reflected within optical trap 83 so as to be capable of being passed through localized regions of interference filter 82 at any of the plurality of points $a'$. As illustrated, the control potential applied to interference filter 82 is such as to render that filter locally transmissive in a region so as to permit the resultant output beam to emerge along a path 85. In a similar manner, the control potential applied to filter 43 is capable of enabling emergence of the output beam from any one of a number of different regions in filter 43.

Preferably, the taper of the wedge construction of filter 82 (or the width of the sound pulse in the equivalent alternative utilizing the FIGURE 6 device) is such as to render the transmission region in interference filter 82 sufficiently wide to embrace any three of the adjacent possible light-emergence regions, such as adjacent regions $a'$, $b'$ and $c'$. In this case, the particular one of the three regions from which the light actually will emerge is dependent upon which one of paths $a$, $b$ and $c$ the light educed from filter 43 is traversing at any given instant. Consequently, it is preferable to utilize the first stage scanning unit, composed of interference filter 43 and optical trap 44, as a fast or fine-control scanner and to use the second stage, composed of filter 82 and trap 83, as a slow scanner or coarse control. That is, with a rapid scan of control potential applied to filter 43, the beam educed therefrom alternates sequentially between paths $a$, $b$ and $c$. Correlated therewith, the scan rate of the transmissive region in filter 82 is much lower so as to in effect gate open for transmission all of the first set of regions $a'$, $b'$ and $c'$. By the time the scanning action of filter 43 precedes from path $a$ through paths $b$ and $c$ and returns again to path $a$, the scanning region in filter 82 has moved on to the next set of second stage paths $a'$, $b'$ and $c'$.

Only three primary beam paths between the two stages are illustrated in FIGURE 11 for clarity. Of course, in practice the first stage scanning unit may easily control a number of additional discrete positions, with that many more image elements being obtainable from the second stage unit. The limitation on the number of reflections needed with the apparatus of FIGURE 11 is striking. For producing a given line of a television raster having 700 elements, a single-stage selector, as in FIGURE 5 for example, requires approximately 1,399 reflections throughout the device. In comparison, for the same line of 700 elements, the two-stage system would need to have but 27 and 26 effective elements in the respective stages and this would necessitate but 104 beam reflections to produce the last image element.

Referring to FIGURE 5, it will be recalled that the potential applied to terminals 50 is increased to cause the output path to move along the interference filter. This means that, after each single scan, the potential across dielectric element 49 must change abruptly back to the beginning value. To avoid difficulty which may arise when the storage capacity of the dielectric is high, it is further contemplated to arrange the interference filter so that the potential is first increased during one portion of the scan to a predetermined level and then is decreased therefrom back to at least approximately the initial value by the end of that same single scan. FIGURE 12 illustrates one embodiment incorporating this mode of potential variation.

The device of FIGURE 12 is constructed and operated in essentially the same manner as that of FIGURE 5 and includes the same optical trap 44 including reflectors 45 and 46. However, in FIGURE 12 reflective layer 87 is angled in one direction relative to reflector 45 over one portion of the filter length and then angled in the other direction relative to reflector 45 over the remainder of the filter length. The dielectric element 88 disposed between layer 87 and reflector 45 is similarly shaped so as to have its maximum thickness midway of the length of reflector 45 and to decrease in thickness in both directions therefrom.

In operation, any given value of control potential creating a transmission region to one side of the point of maximum thickness of element 88 produces a second transmissive region spaced on the other side of that point. An auxiliary wedge-shaped interference filter, operating with a very slow scan rate so as to function as a shutter, may be disposed on the output side of reflective layer 87 to discriminate between the two possible points of emission. Alternatively, such discrimination is obtained inherently when the FIGURE 12 device is utilized as the first stage or fast scanner of the FIGURE 11 system. That is, the slower scanning rate of the second stage interference filter 82 has a transmission region which discriminates between otherwise ambigously-scheduled emitting regions in two spaced portions of the first stage scanner.

As another alternative for the use of the FIGURE 12 embodiment as the first stage scanner in the FIGURE 11 system, the waveform of the control potential applied across dielectric element 88 is caused to increase in steps to a maximum value and then decreases from that value in similar steps but with the step levels on increase being different from those on decrease as shown in FIGURE 13. Correlated with the steps are the input admitting gaps in reflector 84 or equivalent stops anywhere between the first and second stages. Each particular step level is sufficiently different from any other so that an applied potential corresponding to that level permits transmission from interference filter 43 only along one path at any time. To similar ends, it is contemplated as a still further alternative to construct the wedge-shaped interference filter itself in a series of discrete steps, otherwise applying the same principles as hereinbefore discussed. Also, the wedge-shaped interference filter of FIGURE 12 need not be two-wedge-shaped sections bounded by straight lines, but instead layer 87 may be a continuously curved or spherical surface.

FIGURES 14a and 14b represent a display system including an optically-resonant cavity 90 which may, for example, include an active lasing element. In this case, the cavity is essentially defined by reflectors 91 and 92 which correspond to reflectors 45 and 46 of optical trap 44 in FIGURE 5. Reflector 91 also forms a part of an interference filter 93 which further includes a reflective layer 94 spaced from reflector 91 by a dielectric element 95. Again as in the case of the interference-filter dielectric elements previously discussed, element 95 has an index of refraction subject to change in response to the application of an applied control field.

As more particularly shown in FIGURE 14b, reflector 91 is discontinuous, being composed of a series of parallel spaced stripes 91a, 91b. Similarly, reflective layer 94 is composed of a series of parallel spaced conductive stripes 94a, 94b arranged orthogonally to stripes 91a, 91b. Consequently, the two sets of stripes define a matrix the individual respective elements of which are capable of being subjected to opposing potentials selectively or in time sequence to create an electric field across element 95 only at the point of intersection of the particular ones of the stripes energized at any one instant.

The thickness of dielectric element 95 is selected so that the one-way optical path length through the resultant interference filter is normally such as to render the filter nontransmissive of the light existing within cavity 90. However, the selectively applied control potential changes the index of refraction, in the region through element 95 aligned with the intersection point of the respectively energized stripes, to a value that the optical path length in that region is effectively one-half the light wavelength. Consequently, the light produced in cavity 90 emerges from the external surface of dielectric element 95 in that region. The light-emerging region is caused to be scanned to define a raster in the usual manner of a scanning matrix.

Numerous different embodiments have been described herein all of which advantageously utilize the particular properties of optical traps and interference filters. While the elemental structure disclosed functions basically as a light modulator, particular attractiveness is found in the arrangement of the elements to constitute a light display system. In each case, the actual number of physical components involved is comparatively few and, because of the short distance encountered in terms of light-frequency wavelength, the device may be extremely compact while yet being capable of being constructed as a rigid package.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

We claim:
1. A radiation translating device comprising:
a pair of opposingly spaced reflectors receptive to a beam of radiation for multiply reflecting said beam back and forth therebetween, one of said reflectors being responsive to a stimulus for creating a localized region therein highly transmissive of said beam at one of its areas of incidence upon said one reflector;
and control means for subjecting said one reflector to said stimulus including a reflective layer effectively spaced optically from the side of said one reflector opposite the side which faces said other reflector by an integral multiple of one-half the wavelength of said radiation to and inclined in one direction relative to said one reflector over one portion of the latter and in the other direction relative thereto over the other portion to constitute an interference filter transmissive of said beam;
said control means further including adjusting means for varying the effective optical spacing between said one reflector and said reflective layer to move said region.

2. A device as defined in claim 1 in which said adjusting means includes:
an element of material disposed between said reflective layer and said one reflector with said element having an effective index of refraction to said radiation variable in response to an applied field;
and means for applying an adjustable-amplitude field across said element.

3. A device as defined in claim 2 in which the amplitude of said field increases in discrete steps during a predetermined time interval.

4. A device as defined in claim 3 in which said steps increase during a first portion of said interval to a predetermined value and decrease during a second portion of said interval.

5. A device as defined in claim 4 in which the levels of said steps during said first portion is different from the levels of said steps during said second portion.

6. A radiation translating device comprising:
a pair of opposingly spaced reflectors receptive to a beam of radiation for multiply reflecting said beam back and forth therebetween, one of said reflectors being responsive to a stimulus for creating a localized zone therein highly transmissive of said beam at one of its areas of incidence upon said one reflector;
and control means for subjecting said one reflector to said stimulus including a reflective layer effectively spaced optically from the side of said one reflector opposite the side which faces said other reflector and inclined at an angle to said one reflector, defining a said localized zone in which the effective optical spacing between said layer and said reflector is equal to an integral multiple of one-half the wavelength of said radiation to constitute an interference filter transmissive of said beam through said localized zone;

said control means further including adjusting means for varying the effective optional spacing between said one reflector and said reflective layer to move said localized zone.

7. A device as defined in claim 6 in which said adjusting means includes:
an element of dielectric material disposed between said reflective layer and said one reflector with said element having an index of refraction to said radiation variable in response to an electric field;
and means for applying an adjustable-amplitude field across said element.

8. A device as defined in claim 6 in which said adjusting means includes:
an element of electrostrictive material between said reflective layer and said one reflector with said element having a thickness which is variable in response to an electric field;
and means for applying an adjustable-amplitude electric field across said element.

9. A radiation translating device comprising:
a pair of opposingly spaced reflectors receptive to a beam of radiation for multiply reflecting said beam back and forth therebetween, one of said reflectors being responsive to a stimulus for creating a localized region therein highly transmissive of said beam at one of its areas of incidence upon said one reflector, both of said reflectors being effectively curved toward one another in an amount refocusing said beam on said one of the multiple reflections thereof;
and control means for subjecting said one reflector to said stimulus including a reflective layer effectively spaced optically from the side of said one reflector opposite the side which faces said other reflector by an integral multiple of one-half the wavelength of said radiation to constitute an interference filter transmissive of said beam;
said control means further including adjusting means for varying the effective optical spacing between said one reflector and said reflective layer to move said region.

10. A radiation translating device comprising:
a pair of opposingly spaced reflectors receptive to a beam of radiation for multiply reflecting said beam back and forth therebetween, one of said reflectors being responsive to a stimulus for creating a localized region therein highly transmissive of said beam at one of its areas of incidence upon said one reflector;
an optical lens disposed between said reflectors and having a refractive power of a value refocusing said beam on each one of the multiple reflections off one of said reflectors;
and control means for subjecting said one reflector to said stimulus including a reflective layer effectively spaced optically from the side of said one reflector opposite the side which faces said other reflector by an integral multiple of one-half the wavelength of said radiation to constitute an interference filter transmissive of said beam;
said control means further including adjusting means for varying the effective optical spacing between said one reflector and said reflective layer to move said region.

11. A radiation translating device comprising:
a pair of opposingly spaced reflectors receptive to a beam of radiation for multiply reflecting said beam back and forth therebetween, one of said reflectors being responsive to a stimulus for creating a localized region therein highly transmissive of said beam at one of its areas of incidence upon said one reflector;
control means for subjecting said one reflector to said stimulus including a reflective layer effectively spaced optically from the side of said one reflector opposite the side which faces said other reflector by an integral multiple of one-half the wavelength of said radiation to constitute an interference filter transmissive of said beam;
said control means further including adjusting means for varying the effective optical spacing between said one reflector and said reflective layer to move said region in a first direction;
and scanning means receptive of said radiation transmitted through said region for deflecting said radiation in a second direction.

12. A device as defined in claim 11 in which said scanning means comprises:
a pair of space-opposed elements receptive of said transmitted radiation for multiply reflecting the latter back and forth therebetween with one of said elements being responsive to a control effect for creating a localized region therein highly transmissive of said transmitted radiation at one of its areas of incidence upon said one element;
and means for subjecting said one element to said control effect and effecting movement of said region in said second direction.

13. A radiation translating device comprising:
a pair of opposingly spaced reflectors receptive to a beam of radiation for multiply reflecting said beam back and forth therebetween, one of said reflectors being responsive to a stimulus for creating a localized region therein highly transmissive of said beam at one of its areas of incidence upon said one reflector;
control means for subjecting said one reflector to said stimulus including a reflective layer effectively spaced optically from the side of said one reflector opposite the side which faces said other reflector by an integral multiple of one-half the wavelength of said radiation to constitute an interference filter transmissive of said beam;
said control means further including adjusting means for varying the effective optical spacing between said one reflector and said reflective layer to move said region;
a second pair of opposingly spaced reflectors receptive to a bundle of radiation for multiply reflecting said bundle back and forth therebetween, one of said reflectors in said second pair being responsive to a stimulus for creating a localized region therein highly transmissive of said bundle at one of its areas of incidence upon said one second-pair reflector, said bundle being educed therefrom as said beam and with said second pair being disposed adjacent to the first pair in a position directing said beam between said first pair;
and second control means for subjecting said one reflector of said second pair to said stimulus therefor and effecting movement of said region in said second pair.

14. A device as defined in claim 13 in which said first and second control means effect movement of said localized regions, respectively, in the same direction.

15. A device as defined in claim 14 in which said movement of said region in said second pair enables eduction therefrom of said beam at $n$ discrete positions sequentially spaced in said direction, where $n$ is an integer, with the width in said direction of said region in said first pair embracing areas of multiple reflection of said beam corresponding to said $n$ discrete positions.

References Cited

UNITED STATES PATENTS

| | | | |
|---|---|---|---|
| 3,322,485 | 5/1967 | Williams | 350—160 |
| 3,339,151 | 8/1967 | Smith | 331—94.5 |
| 3,427,456 | 2/1969 | Caulfield | 350—160 X |

FOREIGN PATENTS 26,669  8/1931  Australia.

RONALD L. WIBERT, Primary Examiner

P. K. GODWIN, Jr., Assistant Examiner

U.S. Cl. X.R.

178—7.6; 331—94.5; 350—161, 169, 299; 356—112